(12) United States Patent
Miyawaki et al.

(10) Patent No.: US 7,333,411 B2
(45) Date of Patent: Feb. 19, 2008

(54) OPTICAL RECORDING METHOD AND OPTICAL RECORDING DEVICE

(75) Inventors: Hiroyuki Miyawaki, Kanagawa (JP); Katsumi Matsuno, Kanagawa (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 10/505,797

(22) PCT Filed: Nov. 19, 2003

(86) PCT No.: PCT/JP03/14745

§ 371 (c)(1),
(2), (4) Date: Aug. 25, 2004

(87) PCT Pub. No.: WO2004/061844

PCT Pub. Date: Jul. 22, 2004

(65) Prior Publication Data

US 2005/0157619 A1    Jul. 21, 2005

(30) Foreign Application Priority Data

Dec. 27, 2002    (JP) .............................. 2002-382283

(51) Int. Cl.
*G11B 7/00*    (2006.01)
(52) U.S. Cl. .............................. 369/53.18; 369/53.31; 369/59.25
(58) Field of Classification Search .................. None
See application file for complete search history.

(56) References Cited

U.S. PATENT DOCUMENTS

2002/0004911 A1 *  1/2002  Nakai .......................... 713/300

2003/0002413 A1 *  1/2003  Marumori et al. ....... 369/53.18

FOREIGN PATENT DOCUMENTS

| JP | 5-54518 | 3/1993 |
|---|---|---|
| JP | 11 232792 | 8/1999 |
| JP | 11 238310 | 8/1999 |
| JP | 2000 21089 | 1/2000 |
| JP | 2001-266496 | 9/2001 |
| JP | 2001-351314 | 12/2001 |
| JP | 2001 351363 | 12/2001 |
| JP | 2002 324321 | 11/2002 |
| JP | 2002-352424 | 12/2002 |
| JP | 2002 373423 | 12/2002 |
| JP | 2003-16640 | 1/2003 |
| JP | 2003-101926 | 4/2003 |
| JP | 2003-132630 | 5/2003 |

* cited by examiner

*Primary Examiner*—Wayne Young
*Assistant Examiner*—Lixi Chow
(74) *Attorney, Agent, or Firm*—Frommer Lawrence & Haug LLP; William S. Frommer; Thomas F. Presson

(57) ABSTRACT

The present invention is directed to an optical disc recording apparatus adapted for recording data onto a recodable/reproducible optical disc, which comprises a system controller (10) for executing finalize processing in the state divided into plural processing and memorizing, into a flash memory (16), a notification of completion of one processing every time the processing is completed.

8 Claims, 12 Drawing Sheets

FIG.5A

| Rzone 1 | Rzone 2 | Invisible Rzone |
|---|---|---|

FIG.5B

| Rzone 1 | Rzone 2 | VTSTT_VOBS | VTSI_BUP | |
|---|---|---|---|---|

FIG.5C

| Rzone 1 | VTSI | TMP_VMGI | VTSTT_VOBS | VTSI_BUP | |
|---|---|---|---|---|---|

FIG.5D

| Rzone 1 | VTS#1 | Invisible Rzone |
|---|---|---|

FIG.5E

| Rzone 1 | VTS#1 | Rzone 3 | VTSTT_VOBS | VTSI_BUP | |
|---|---|---|---|---|---|

FIG.5F

| Rzone 1 | VTS#1 | VTSI | TMP_VMGI | VTSTT_VOBS | VTSI_BUP | |
|---|---|---|---|---|---|---|

FIG.5G

| VTS#1 | VTS#2 | |
|---|---|---|

FIG.5H

| LEAD IN | UDF | VMG | VTS#1 | VTS#2 | ... | VTS#N | LEAD OUT |
|---|---|---|---|---|---|---|---|

OPTICAL RECORDING METHOD AND OPTICAL RECORDING DEVICE

TECHNICAL FIELD

The present invention relates to an optical recording apparatus and an optical recording method for recording data onto an optical recording medium in which recording/reproduction of data can be made such as DVD-R (DVD Recordable) or DVD-RW (DVD Re-recordable), etc.

This Application claims priority of Japanese Patent Application No. 2002-382283, filed on Dec. 27, 2002, the entirety of which is incorporated by reference herein.

BACKGROUND ART

At present, in DVD (Digital Versatile Disc) which is one of large capacity type optical discs, there are provided DVD-R (DVD Recordable) in which recording operation of data can be made, DVD-RW (DVD Re-recordable) in which rewrite operation of recorded data can be made, and DVD-RAM (DVD Random Access Memory), etc. Data recorded by DVD-R or DVD-RW, etc. cannot be reproduced by reproducing apparatuses and PCs (Personal Computers), etc. which cope with only DVD-Video format because the format thereof is not adapted. In order to reproduce data recorded on DVD-R or DVD-RW (hereinafter refereed to as DVD-R/-RW) by these reproducing apparatuses or PCs, it is necessary to convert format of data recorded on DVD-R/-RW into a predetermined format in conformity with DVD-Video format. In this case, in order to reproduce data recorded on DVD-R/-RW by PC, it is necessary to adapt data recorded on DVD-R/-RW to the standard of Universal Disk Format (UDF).

As a recording system of writing moving picture onto such optical discs, there are Incremental Recording System (hereinafter referred to as INC system), and Restricted Overwrite system (hereinafter referred to as ROW system). The INC system is employed mainly at DVD-R, etc., and a system of sequentially recording moving pictures. The ROW system is employed mainly at DVD-RW, etc., and is a system of recording moving picture at random. It is to be noted that in the case where data is recorded into unrecorded area also in the ROW system, it is necessary to sequentially record moving pictures. In these INC system and ROW system, reservation of recording area and recording management information of the entirety of optical disc such as address to be subsequently recorded, etc. are preserved by RMA (Recording Management Area) provided at the inner circumferential side with respect to Lead-In.

Both in the case of the INC system and the ROW system which are as described above, finalize processing is required for ensuring compatibility with reproduction only optical disc.

However, for performing padding write until 70 mm, preparation of VMG from management information of respective titles, and recording lead-in and lead-out, etc. for a time during which such finalize processing is performed, it takes much time in the finalize processing. At this time, when attention is drawn to a system operative by battery like portable equipment, in the case where the battery is consumed in the middle of the finalize processing, the medium therefor is placed in uncompleted state which is neither writable-once intermediate state nor the finalize state. As a result, there was the problem that inconvenience takes place in the recording/reproduction subsequent thereto.

DISCLOSURE OF THE INVENTION

An object of the present invention is to provide a novel optical recording method and a novel optical recording apparatus which can solve the problems that prior arts as described above have.

A more practical object of the present invention is to provide an optical recording method and an optical recording apparatus which can securely perform finalize processing with respect to optical recording media.

The present invention proposed in order to attain the objects as described above is directed to an optical recording method in an optical recording apparatus adapted for performing recording of data with respect to optical recording media, the optical recording method comprising: executing finalize processing in the state divided into plural processing; and memorizing, into a non-volatile memory, a notification of completion of one processing every time the processing is completed.

In the optical recording method according to the present invention, there is employed such an approach to confirm the remaining quantity of the battery before starting every processing to judge by the battery remaining quantity whether or not processing to be executed is completed, whereby in the case where the battery remaining quantity is sufficient, that processing is executed.

In another optical recording method according to the present invention, in the case where the battery remaining quantity is not sufficient, the finalize processing is interrupted at the corresponding processing, whereby in the case where there results the time point where the battery remaining quantity becomes sufficient, the finalize processing is restarted subsequently to the processing which has been memorized into a non-volatile memory.

The present invention is directed to an optical recording apparatus adapted for performing recording of data with respect to an optical recording medium, the optical recording apparatus comprising: control means for executing finalize processing in the state divided into plural processing and memorizing, into a non-volatile memory, a notification of completion of one processing every time the processing is completed.

In the optical recording apparatus according to the present invention, the control means confirms the remaining quantity of the battery before starting every processing to judge by the battery remaining quantity whether or not processing to be executed is completed, whereby in the case where the battery remaining capacity is sufficient, the control means executes that processing.

In another optical recording apparatus according to the present invention, the control means is operative so that in the case where the battery remaining quantity is not sufficient, it interrupts finalize processing at the processing, whereby in the case where the battery remaining quantity becomes sufficient again, it restarts finalize processing subsequently to the processing which has been memorized into a non-volatile memory.

Still further objects of the present invention and practical merits obtained by the present invention will become more apparent from the description of the embodiments which will be given below with reference to the attached drawings.

BRIEF DESCRIPTION OF THE DRAWINGS

FIGS. 5A to 5H are views used for explanation of recording processing for moving picture file by the INC system in the optical disc recording/reproducing apparatus.

FIGS. 12A to 12G are views used for explanation of recording processing for moving picture files by the ROW system in the optical disc recording/reproducing apparatus.

BEST MODE FOR CARRYING OUT THE INVENTION

The optical recording method and the optical recording apparatus according to the present invention will now be described with reference to the attached drawings.

Figure 1:
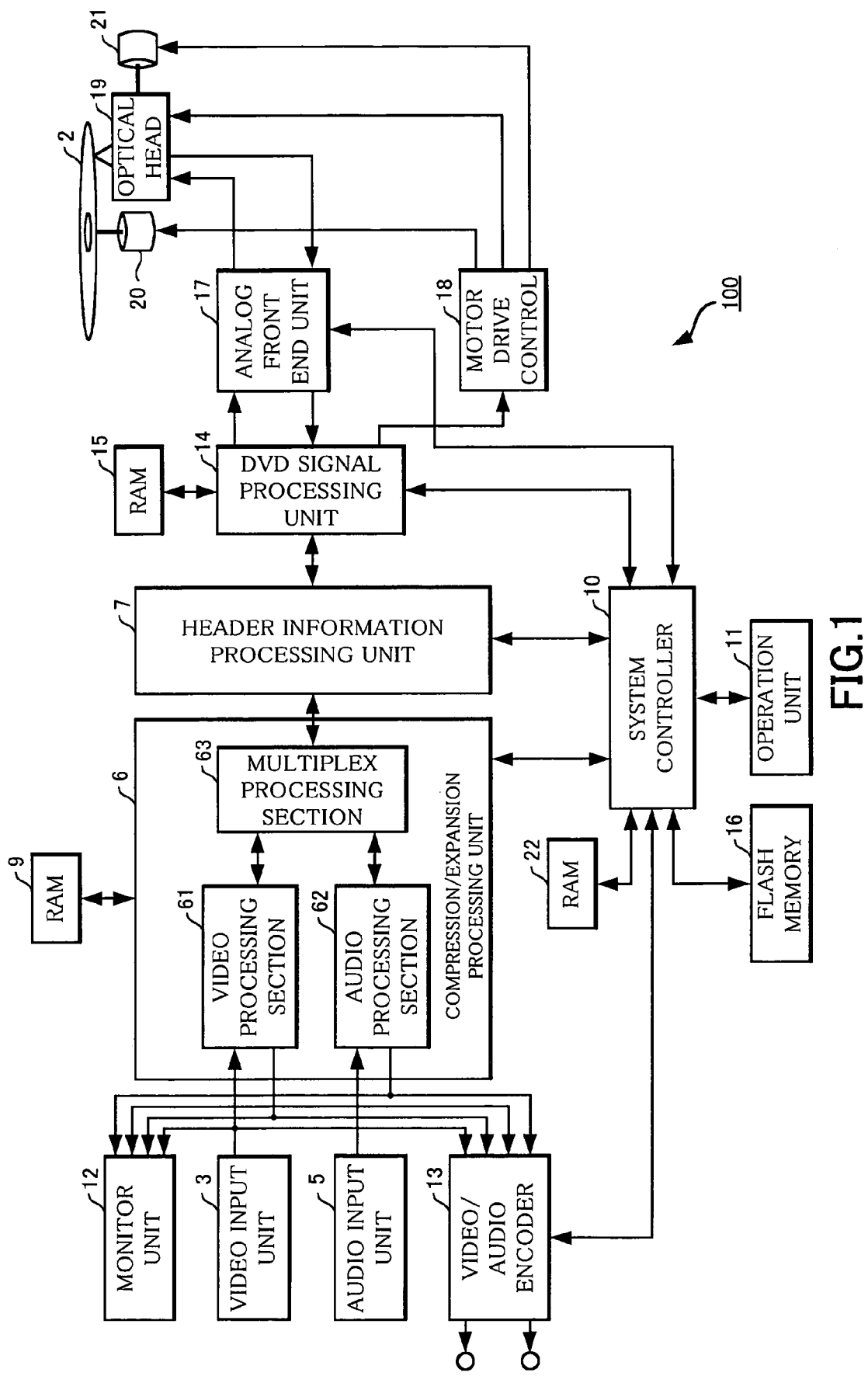
FIG. 1 is a block diagram showing the configuration of an optical disc recording/reproducing apparatus to which the present invention has been applied.

The present invention is applied to, e.g., optical disc recording/reproducing apparatus 100 having the configuration as shown in FIG. 1.

The optical disc recording/reproducing apparatus 100 shown in FIG. 1 is operative to store inputted stream data into a random access memory 15, to read out, every predetermined quantity, stream data which has been stored in the random access memory 15, and to record, onto an optical disc 2, the stream data every predetermined quantity which has been read out. Further, the optical disc recording/reproducing apparatus 100 is operative to generate reproduction management information utilized in reproducing, from the optical disc 2, stream data every predetermined quantity which has been recorded on the optical discs 2, to store the generated reproduction management information into a random access memory 22, to read out the reproduction management information stored in the random access memory 22, and to store, into a flash memory 16 which is non-volatile memory medium, the reproduction management information which has been read out. In the optical disc recording/reproducing apparatus 100 having such configuration, when stream data every predetermined quantity is being recorded onto the optical disc, supply of power of the optical disc recording/reproducing apparatus 100 is cut off so that reproduction management information stored in the random access memory 15 is dissipated before it is recorded onto the optical disc 2. Thus, in the case where stream data is imperfectly recorded on the optical disc 2, it is possible to recover imperfectly recorded stream data on the basis of the reproduction management information stored in the flash memory 16.

The optical disc recording/reproducing apparatus 100 shown in FIG. 1 uses, as the optical disc 2, DVD-R (DVD Recordable) or DVD-RW (DVD Re-recordable) to record image pick-up result onto the optical disc 2.

The optical disc recording/reproducing apparatus 100 is, in concrete terms, camera integrated type video recorder, and is adapted to use DVD-R (DVD Recordable) for optical disc 2 as a recording medium to record image pick-up result onto the optical disc 2 by the INC system.

This optical disc recording/reproducing apparatus 100 comprises, as shown in FIG. 1, a video input unit 3, an audio input unit 5, a compression/expansion processing unit 6, a header information processing unit 7, a random access memory (RAM) 9, a system controller 10, an operation unit 11, a monitor unit 12, a video/audio encoder 13, a DVD signal processing unit 14, a random access memory 15, a flash memory 16, an analog front end unit 17, a motor drive control unit 18, an optical head 19, a spindle motor 20, a sled motor 21, and a random access memory 22. The compression/expansion processing unit 6 comprises a video processing section 61, an audio processing section 62, and a multiplex processing section 63.

In this optical disc recording/reproducing apparatus 100, the video input unit 3 serves to convert video signal which is image pick-up result obtained by image pick-up means (not shown), or video signal inputted from external equipment, into digital signal to thereby generate video data. The video input unit 3 delivers the video data thus generated to the compression/expansion processing unit 6, the monitor 12 and the video/audio encoder 13. In this example, the image pick-up means included therewithin outputs image pick-up result under control of the system controller 10. Thus, the video input unit 3 inputs video data in accordance with control of the image pick-up mean by the system controller 10.

The audio input unit 5 converts audio signal acquired by the microphone, or audio signal by external input into digital signal to thereby generate audio data, and delivers the audio data thus generated to the compression/expansion processing unit 6, the monitor unit 12 and the video/audio encoder 13.

The operation of the compression/expansion processing unit 6 is switched by control of the system controller 10. At the time of recording, the compression/expansion processing unit 6 compresses and multiplexes video data and audio by using the random access memory 9 and outputs the data thus processed to the header information processing unit 7. Moreover, at the time of reproduction, the compression/expansion processing unit 6, by using the random access memory 9, separates data obtained by the header information processing unit 7 into video data and audio data and respectively performs data expansion thereof, and outputs the data thus obtained to the monitor unit 12 and the video/audio encoder 13.

Namely, at the compression/expansion processing unit 6, at the time of recording, the video processing section 61 performs data compression of video data outputted from the video input unit 3 in accordance with the format of MPEG2 by control of the system controller 10 and outputs the data thus obtained.

At the time of reproduction, the video processing section 61 performs data expansion of video data outputted from the multiplex processing section 63 in correspondence with the data compression format thereof, and outputs the video data thus obtained. The audio processing section 62 is operative so that it performs, at the time of recording, data compression of audio data inputted from the audio input unit 5 by the format such as MPEG, Dolby audio or linear PCM, etc., and performs, at the time of reproduction, data expansion of audio data obtained from the multiplex processing section 63, and outputs the data thus obtained. The multiplex processing section 63 performs, at the time of recording, time-division multiplexing of video data outputted from the video processing section 61 and audio data outputted from the audio processing section 62, and outputs the data thus obtained to the header information processing unit 7. The multiplex processing section 63 separates, at the time of reproduction, video data and audio data from time-division multiplexed data outputted from the header information processing unit 7 and respectively outputs those data to the video processing section 61 and the audio processing section 62.

The monitor unit 12 comprises a display mechanism for monitoring video data inputted from the video input unit 3, audio data inputted from the audio input unit 5, and/or video data and audio data which are outputted from the compression/expansion processing unit 6, and an audio processing mechanism. At the optical disc recording/reproducing apparatus 100, image pick-up result and reproduction result can be monitored by the monitor unit 12.

The video/audio encoder 13 performs data compression of video data and audio data which are inputted from the audio input unit 5, or video data and audio data which are outputted from the compression/expansion processing unit 6 by predetermined format, and outputs the data thus obtained to the external equipment. Thus, at the optical disc recording/reproducing apparatus 100, image pick-up result and reproduction result can be monitored by the external equipment.

At the time of recording, the header information processing unit 7 receives time-divisional multiplexed data outputted from the compression/expansion processing unit 6, adds header information and/or header information of extension file, etc. specific to DVD, and outputs the information thus added. The header information processing unit 7 generates data of UDF, VMG and VTSI, etc. by information from the system controller 10, and outputs the data thus generated to the DVD signal processing unit 14. Moreover, at the time of reproduction, the header information processing unit 7 separates header information added at the time of recording from output data of the DVD signal processing unit 14 to output it to the compression/expansion processing unit 6. Further, the header information processing unit 7 notifies this separated header information to the system controller 10.

The system controller outputs reproduction management information stored in the random access memory 22 to the DVD signal processing unit 14. At the time of recording, the DVD signal processing unit 14 generates error correction code from output data of the header information processing unit 7 by using the random access memory 15, adds the error correction code to the output data. Furthermore, the DVD signal processing unit 14 executes scramble processing and processing such as 8/15 modulation, etc. and outputs data train by the processing result to the analog front end unit 17 by serial data train. The system controller outputs predetermined information to the DVD signal processing unit 14, and stores similar content into the flash memory 16. It is to be noted that any non-volatile memory medium may be used in place of flash memory.

At the time of reproduction, in a manner opposite to the above-described recording operation, the DVD signal processing unit 14 performs decoding processing, descramble processing and error correction processing of output data of the analog front end unit 17 to output processing result to the header information processing unit 7. Further, the DVD signal processing unit 14 performs digital/analog conversion of various drive information for spindle control, tracking control, focus control and sled control, which are outputted from the system controller 10, to generate these drive signals, and outputs the generated drive signals to the motor drive control unit 18.

The analog front end unit 17 generates light quantity control signal with respect to laser beams irradiated from the optical head 19 onto the optical disc 2 and outputs the generated light quantity control signal. At the time of reproduction, the analog front end unit 17 holds light quantity of laser beams, which is irradiated from the optical head 19 to the optical disc 2, at a predetermined light quantity for reproduction, by the light quantity control signal. At the time of recording, the analog front end unit 17 changes signal level of the light quantity control signal in accordance with output data from the DVD signal processing unit 14, and thereby intermittently increases light quantity of laser beams from light quantity at the time of reproduction to light quantity at the time of recording in accordance with output data from the DVD signal processing unit 14.

Moreover, the analog front end unit 17 amplifies light receiving result of return light obtained from the optical head 19 to perform arithmetic processing thereof. The analog front end unit 17 thereby generates reproduction signal of which signal level changes in correspondence with pit train formed at the optical disc 2 and outputs reproduction data, which is binary number discrimination result obtained by a predetermined processing to reproduction signal, to the DVD signal processing unit 14. The arithmetic processing generates a tracking error signal and a focus error signal, etc. of which signal levels change in accordance with tracking error quantity and focus error quantity to output these signals to the system controller 10 by digital signals.

The motor drive control unit 18 drives respectively corresponding mechanisms by various drive signals outputted from the DVD signal processing unit 14. Namely, the motor drive control unit 18 drives the spindle motor 20 by drive signal for spindle control among these drive signals, and drives the sled motor 21 by drive signal for sled control. In addition, the motor drive control unit 18 drives actuator mounted at the optical head 19 by drive signal for tracking control and drive signal for focus control.

The spindle motor 20 rotationally drives the optical disc 2 at a predetermined rotational speed in the state where the optical disc 2 is chucked. The sled motor 21 moves the optical head 19 in the radial direction of the optical disc 2.

The optical head 19 serves to emit laser beams from semiconductor laser included therewithin by a light quantity control signal outputted from the analog front end unit 17 to converge the laser beams onto the information recording surface of the optical disc 2 through the object lens. The optical head 19 guides return light, which is obtained from the optical disc 2 by irradiation of the laser beams, to a predetermined light receiving element through the object lens to output light receiving result of the light receiving element to the analog front end unit 17. The optical head 19 is moved by actuator driven by drive signal for tracking control and drive signal for focus control, whereby tracking control and/or focus control are performed. At the optical head 19, light quantity of laser beams is intermittently increased by light quantity control signal to thereby locally elevate temperature of the information recording surface of the optical disc 2 so that recording of desired data is performed.

The system controller 10 is comprised of computer which controls the operation of the entirety of the optical disc recording/reproducing apparatus 100, and serves to execute processing program installed in advance in the optical disc recording/reproducing apparatus 100 to thereby control the operations of respective units by operation input of user obtained through the operation unit 11, and various signals, etc. detected at the analog front end unit 17. Namely, the system controller 10 generates drive information for tracking control and drive information for focus control by the tracking error signal and the focus error signal which are detected at the analog front end unit 17, converts the drive information thus generated into analog signals at the DVD signal processing unit 14 to output the analog signals to the motor drive control unit 18, and thereby executes processing of tracking control and processing of focus control. In addition, the system controller 10 detects laser beam irradiation position by header information, etc. detected at the header information processing unit 7, generates drive information for sled control by the detection result to output the drive information thus generated to the DVD signal processing unit 14, and thereby executes processing such as seek, etc. In a manner similar to the above, the system controller 10 executes processing of spindle control.

Figure 2:
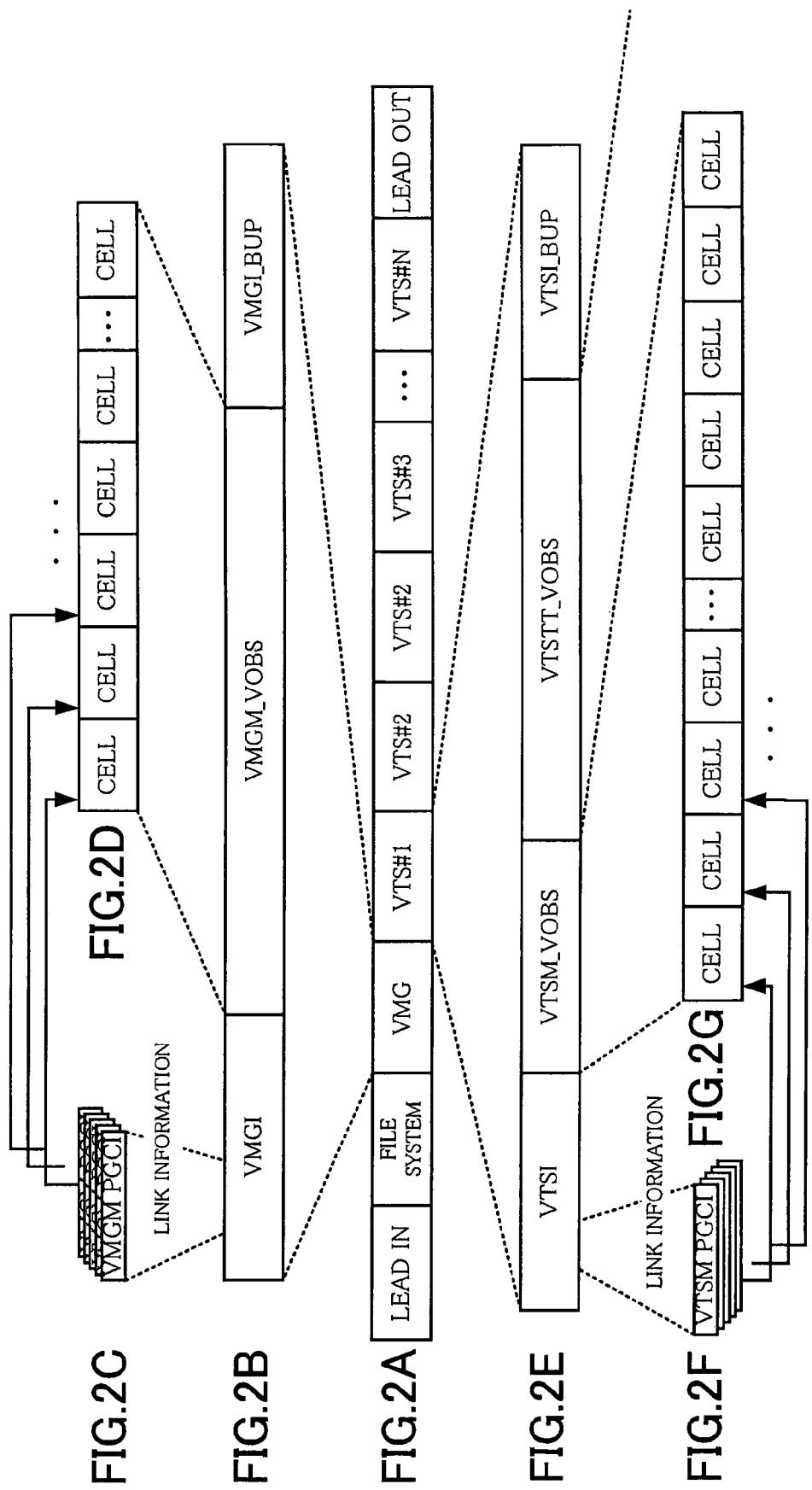
FIGS. 2A to 2G are views used for explanation of DVD-video format.

Here, outline of DVD-Video format is shown in FIG. 2.

FIG. 2 is a view showing the outline of data structure of the optical disc in which data are recorded by the DVD-Video Format Recording system which is logical format in conformity with the DVD-Video format. On the information recording surface of the optical disc corresponding to the DVD-Video format, as shown in FIG. 2A in which information recorded in spiral form are represented in belt shape, there are assigned, from the innermost side which is the leading side, Lead-in area showing recording start of information, Data Zone, and Lead-out area for information at the outermost circumference. Desired real data are recorded in the Data Zone.

Here, the Data Zone is partitioned (divided), from the Lead-In area side, into UDF (Universal Disk Format) area A1 serving as file system area where UDF bridge configuration is described, VMG (Video Manager) area A2 serving as DVD management information area, and VTS (Video Title Set) area A3 in which real time data are recorded.

The UDF area A1 and the VMG area A2 are areas for recording information which performs management of video data recorded in the VTS area A3. The UDF area A1 is called first management information area, and the VMG area A2 is called the second management information area. The VMG area A2 serving as the second management information area is an area corresponding to the reproduction management system specific to the DVD-Video format, and is adapted so that information for performing reproduction management of the entirety of video data recorded in the VTS recording area A3 is recorded. On the contrary, the UDF area A1 serving as the first management information area is an area corresponding to file management system by PC, etc., and is adapted so that reproduction management information recorded in the VMG area A2 and information for performing management of the entirety of video data recorded in the VTS recording area A3 are recorded by format such as UDF, etc. for ensuring compatibility with file system at PC, etc. Thus, information for retrieving the leading portion of VMG area A2 is also included in UDF area A1.

Further, as shown in FIG. 2B, VMG comprises VMGI (Video Manager Information), VMGM_VOBS (Video Object Set for Video Manager Menu), and VMGI_BUP for backup.

The VMGI is control information with respect to the entirety of DVD video zone, and is comprised of a group of VMGM_PGCI (VMG Menu Program Chain Information) having link with respect to the respective VTS menus as shown in FIG. 2C.

The VMGM_VOBS is video information for title select menu, and is comprised of plural CELLs respectively corresponding to title menus as shown in FIG. 2D. VMGI_BUP is complete copy of VMGI.

As shown in FIG. 2E, VTS comprises VTSI (Video Title Set Information), VTSM_VOBS (Video Object Set for the VTS Menu), VTSTT_VOBS (Video Object Set for Titles in a VTS), and VTSI_BUP (Backup of VTSI) for backup of VTSI.

The VTSI is adapted so that control information of respective VTSs are stored, and comprises a group of VTSM_PGCI (VTS Menu Program Chain Information) having link with respect to delimiter within respective VTSM_VOBS, and a group of VTS_PGCI (VTS Program Chain Information) having link with respect to delimiter within respective VTSTT_VOBS.

As shown in FIG. 2G, TSM_VOBS (Video Object Set For Video Title Set Menu) are comprised of plural CELLs respectively corresponding to respective pages of route menu pictures. In this case, VTSM_VOBS is option.

In the VTSTT_VOBS area, video data by MPEG (Moving Picture Experts Group)2 which is real data, i.e., video data as actual contents are formed by data packeted by predetermined quantity, and are stored as set of plural CELLs similarly as shown in FIG. 2G.

VTSI_BUP area is area where data for backup of VTSI are recorded.

In the case where optical disc having the above-described data structure is accessed by PC, etc., it is possible to retrieve a desired file thus by UDF area A1 to reproduce the file. In the case where such optical disc is reproduced by the DVD player, it is possible to reproduce the desired title thus retrieved by retrieving the leading portion of the VMG area by the UDF area A1 and a desired title by information of the VMG area A2.

As long as DVD reproduction only machines which have been already popularized satisfy the above-mentioned structure, it is possible to correctly perform reproduction. Recording is made by such a procedure capable of structuring the structure with respect to writable-once or overwritable media such as DVD-R/DVD-RW, etc., whereby even recordable media can be reproduced by reproduction only machine. Namely, recording is made in such a manner that the structure can be constructed, and finalize processing is performed at the last time of recording, thus making it possible to prepare media which complies with DVD-Video format and can be reproduced even by existing DVD reproduction only machine. This recording system is called DVD-Video Format Recording.

Figure 3:
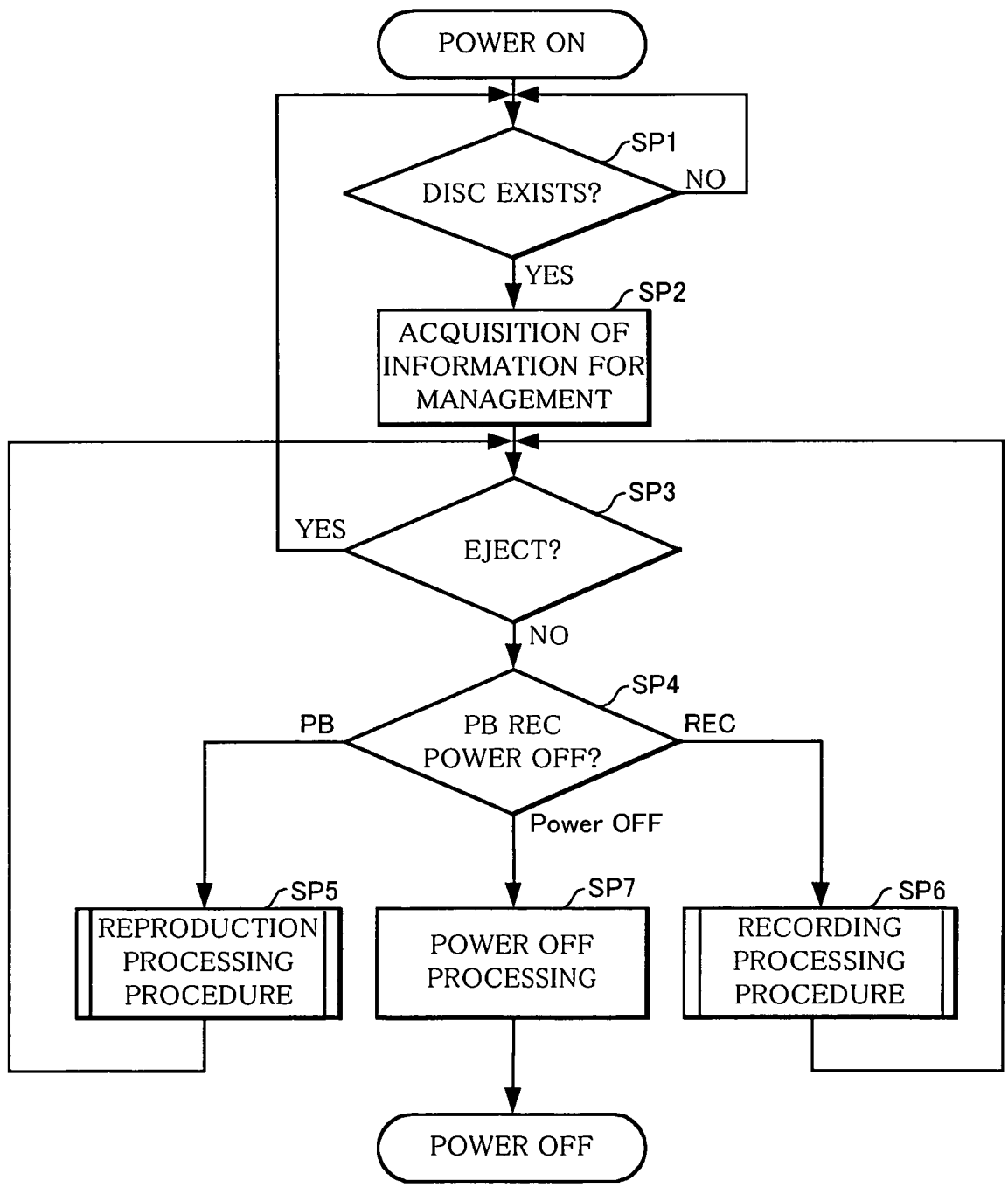
FIG. 3 is a flowchart showing the procedure of the processing executed at the time when power is tuned ON in the optical disc recording/reproducing apparatus according to the present invention.

The optical recording/reproducing apparatus 100 shown here executes processing procedure shown in FIG. 3 by turning ON of power supply on the premise of the processing relating to these optical discs 2. In this example, DVD-R is used as the optical disc 2 in the following processing procedure.

When power is turned ON, the system controller 10 judges, at step SP1, by detection result by detection mechanism for the optical disc 2 (not shown), whether or not the optical disc 2 is present. Here, when denial result is obtained, the system controller 10 repeats the step SP1. On the contrary, in the case where power is turned ON in the state where the optical disc 2 is loaded, when power is further turned ON and the optical disc 2 is then loaded, affirmative result is obtained at the step SP1, whereby processing shifts from the step SP1 to step SP2. It is to be noted that when power is turned OFF in the repetition of the step SP1, processing by the system controller 10 directly shifts to step SP3 to complete this processing procedure.

At the step SP2, the system controller 10 drives the sled motor 21 to move the optical head 19 toward the innermost circumference of the optical disc 2 to acquire reproduction result of the innermost circumferential side from the DVD signal processing unit 14 to thereby acquire data of VMG. This case is the case of the finalize-processed optical disc 2. However, in the case where the optical disc 2 is not yet finalize-processed, since data of VMG is not generated, information of RMA is acquired. In the case where it is judged by information of the RMA that data has been already recorded in the VTS recording area A3 of the optical disc 2, the optical disc 2 is searched to acquire data of VTSI of respective VTSs, Temporary VMGI (TMP_VMGI: Temporary Video Manager Information), and VTSM_VOBS. Thus, the system controller 10 acquires information for management of the optical disc 2 necessary for recording/reproduction of the optical disc 2 similarly to optical disc apparatuses adapted for performing recording/reproduction of ordinary DVD.

Here, TMP_VMGI will be explained. The TMP_VMGI is temporary VMGI recorded along with VTSI at the time point when recording of one VTS is completed, and includes information of the number of VTSs recorded at the optical disc 2 or disc name, and physical arrangement corresponding to 99 VTSs and name of VTS, etc. In the TMP_VMGI, latest information with respect to all VTSs recorded until now are included at the time of recording of TMP_VMGI. In the case where plural titles are recorded onto DVD-R, plural TMP_VMDI are recorded at plural portions. In this case, TMP_VMGI located at the outermost circumferential side is the latest TMP_VMGI.

In this processing, the system controller 10 acquires data of UDF in combination in addition to data of VMG. Moreover, in the case where intermediate management information is recorded, in reproduction of VTS recording area A3, this intermediate management information is also acquired in combination. Thus, the system controller 10 is adapted to acquire, in combination, information for management of extension file so that the extension file which is not defined by DVD-Video format can be reproduced by the optical disc 2. The system controller 10 records a series of information for management, which have been acquired in this way, into memory included therewithin to hold such information.

Subsequently, processing by the system controller 10 shifts to step SP3 to judge whether or not ejection of the optical disc 2 is instructed by user. When the affirmative result is obtained at this step, ejection of the optical disc 2 is instructed with respect to loading mechanism (not shown) thereafter to return to the step SP1.

On the contrary, when user executes instruction except for ejection of the optical disc 2, processing shifts from step SP3 to step SP4 to judge whether the operation by user is an operation for instructing recording (indicated by REC), an operation for instructing reproduction (playback) (indicated by PB), or an operation for instructing turning OFF of power supply (indicated by Power OFF). Here, in the case where the operation by user is operation for instructing reproduction, processing by the system controller 10 shifts from step SP4 to SP5 to execute reproduction processing procedure which reproduces files recorded on the optical disc 2 to return to the step SP3.

On the contrary, in the case where the operation by user is an operation for instructing recording, processing by the system controller 10 shifts from step SP4 to step SP6 to execute recording processing procedure which records video data onto the optical disc 2 to return to the step SP3. It is to be noted that in the case where the optical disc 2 has been caused to undergo finalize processing so that data cannot be recorded, whereby UDF and VMG are formed, processing by the system controller 10 returns to the step SP3 in the state where recording processing procedure is omitted.

On the contrary, in the case where the operation by user is an operation for turning OFF of power supply, processing by the system controller 10 shifts from step SP4 to step SP7 to execute processing which turns OFF of power supply to complete the processing procedure.

Figure 4:
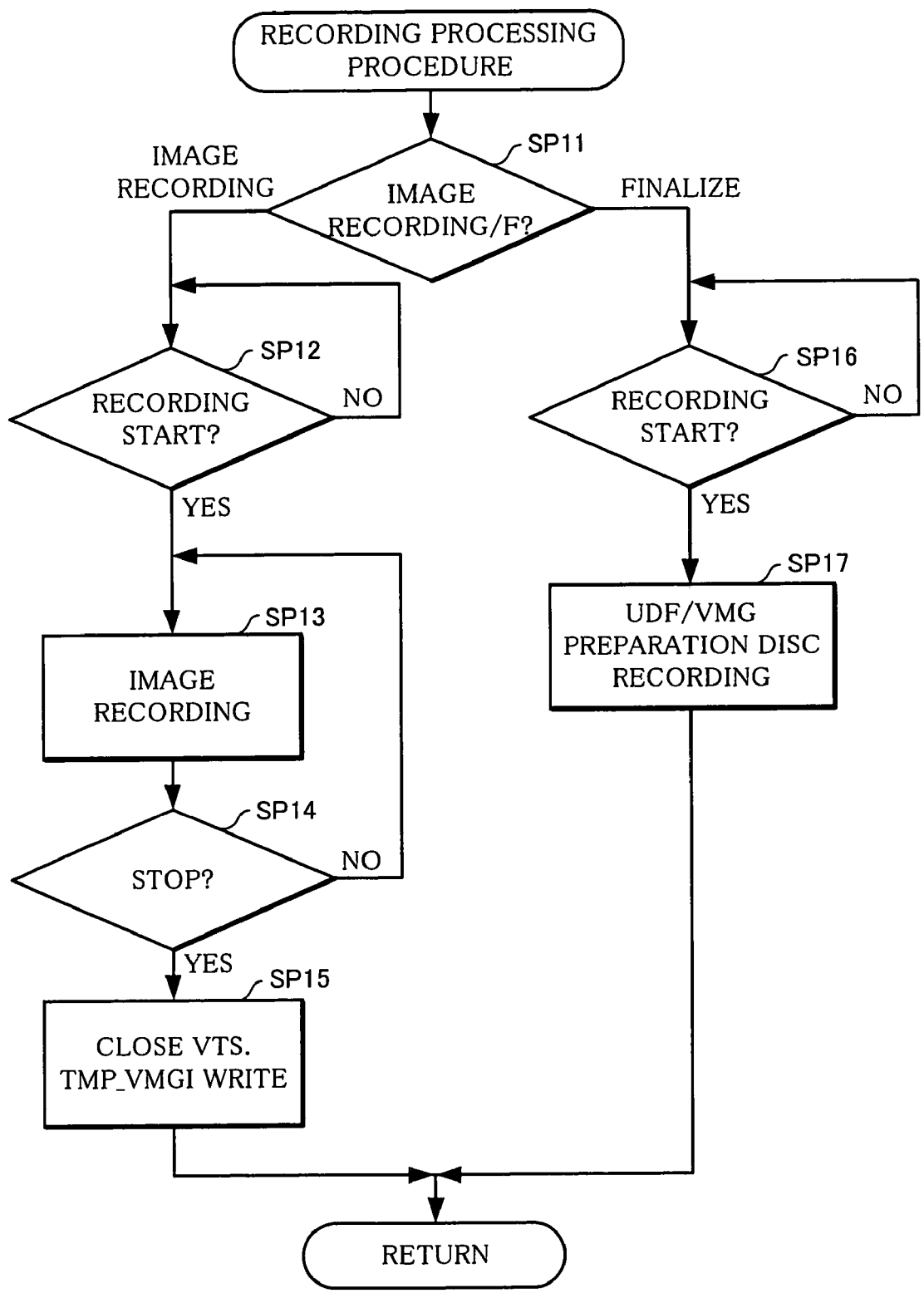
FIG. 4 is a flowchart showing the procedure of recording processing for image file in the optical disc recording/reproducing apparatus.

The system controller 10 performs recording processing in accordance with the procedure indicated by the flowchart of FIG. 4. In the case where the optical disc 2 is DVD-R, files of video data are recorded by the INC system.

In the recording processing procedure shown in the flowchart of FIG. 4, the system controller 10 initially judges at the first step SP11 whether instruction of recording by user is instruction according to recording of image, or instruction according to finalize processing.

Here, in the case where the instruction of recording by user is instruction according to recording of image, processing by the system controller 10 shifts to step SP12 to judge whether or not start of recording is instructed by user. Here, when the denial result is obtained, the system controller 10 repeats the step S12. On the contrary, when the affirmative result is obtained, processing by the system controller 10 shifts from step SP12 to step SP13 to record VTSTT_VOBS by real data.

Further, processing by the system controller 10 shifts to step SP14 to judge whether or not stop of recording is instructed by user. When the denial result is obtained at this step, the processing by the system controller 10 returns to the step SP13. Thus, the system controller 10 repeats processing procedure of the steps SP13-SP14-SP13 to sequentially record real data. When the affirmative result is obtained at the step SP14, the system controller 10 completes recording of real data VTSTT_VOBS.

Subsequently, processing by the system controller 10 shifts to step SP15 to sequentially form VTSI_BUP, VTSI, VTSM_VOBS, and thereby records one VTS and updates TMP_VMGI to complete the recording processing procedure.

On the contrary, in the case where instruction of recording by user is recorded according to finalize processing, processing by the system controller 10 shifts from step SP11 to step SP16 to judge whether or not start of recording is instructed by user. When the denial result is obtained at this step, the system controller 10 repeats step SP16. On the contrary, when the affirmative result is obtained, processing by the system controller 10 shifts from step SP16 to step SP17 to execute finalize processing to complete the processing procedure.

FIG. 5 is a view used for explanation of recording processing of video data by the INC system by taking, as an example, the case where the optical disc 2 is the so-called blank disc where any file is not recorded.

In the INC system, as the area to be written once, three areas are defined at the maximum. These areas are respectively called Rzone, wherein management of respective Rzone is made by RMA.

As shown in FIG. 5A, the system controller 10 updates information of RMA acquired from the optical disc 2 and held in the memory to thereby reserve Rzone1. Further, the system controller 10 updates information of RMA to thereby reserve Rzone2 and Invisible Rzone, and sequentially records video data which is real data into Invisible Rzone to generate VTSTT_VOBS.

Namely, in the case where moving picture is recorded, Rzone is first reserved as shown in FIG. 5A in the INC system. Here, reserve operation of Rzone is executed by defining the area of Rzone1 where there are formed UDF area A1 and VMG area A2 which are areas where management information is to be recorded, by subsequently defining the area of Rzone 2 where VTSI of the leading VTS, VTSM_VOBS and Temporary Video Manager Information (TMP_VMGI) into unrecorded area where VTS recording area A3 is to be formed, and by defining the remaining unrecorded area as area of Invisible Rzone.

Further, in the INC system, moving pictures are sequentially recorded from the leading side of Invisible Rzone to thereby form VTSTT_VOBS by real data. Further, by instruction of user, when recording of real data has been completed with respect to one VTS, VTSI_BUP is recorded subsequently to recording of the real data as shown in FIG. 5B, and, from the leading side as shown in FIG. 5C, VTSI and TMP_VMGI are formed in the Rzone 2 to close the Rzone 2. Although not shown, in the case where VTSM-_VOBS which is option is required, it is recorded into this area. In addition, management information is recorded into memory in correspondence with VTSI of VTS, VTSM-_VOBS, TMP_VMGI to update information of RMA held in the memory. In the INC system, the leading VTS#1 is recorded onto the optical disc in this way.

Subsequently, in the case where next VTS#2 is recorded, in the INC system, the system controller 10 similarly updates information of RMA held in the memory to reserve Rzone 3 in the remaining unrecorded area as shown in FIG. 5D, and ensures areas of VTSI, VTSM_VOBS and TMP_VMGI to define Invisible Rzone. Further, subsequently, as shown in FIG. 5E, after VTSTT_VOBS is formed by recording of real data, VTSI_BUP is formed to record VTSI, VTSM_VOBS and TMP_VMGI into the previously ensured area as shown in FIG. 5F. Thus, at the optical disc, as shown in FIG. 5G, the subsequent VTS#2 is recorded.

In the INC system, in the case where VTSs are successively recorded, unrecorded area is similarly defined so that VTSs are sequentially recorded.

Thus, the system controller 10 is adapted to sequentially record titles by the INC system. Moreover, in the case where the optical disc 2 which has not been yet finalized is loaded to perform write-once operation of moving picture onto the optical disc. 2, similar processing is executed from the end portion of the already recorded title by data of RMA acquired at the step SP1 of FIG. 3 and data of RMA held in the memory to thereby perform write-once operation of moving picture which is image pick-up result.

If the optical disc in which VTSs are sequentially recorded by the INC system so that VTS recording area A3 is formed is not caused to undergo format conversion such as finalize processing, etc., such optical disc cannot be reproduced by reproducing apparatus corresponding to DVD-Video format, etc.

Here, the finalize processing will be explained by using FIG. 5H.

For example, at the optical disc, in order to finally comply with the DVD-Video format, after padding write operation is performed so that the last recording position is in correspondence with 70 mm from the inner circumference, as shown in FIG. 5H, UDF area A2 and VMG area A3 are formed in the Rzone 1 by the finalize processing, Lead-In area is formed at the innermost circumference, and Lead-Out area is formed at the outer circumferential side. By the finalize processing, it is possible to ensure compatibility with DVD-Video format used in reproduction only optical disc DVD-ROM. In this case, in formation of the UDF area A1 and the VMG area A2, data to be recorded into the UDF area A1 and the VMG area A2 is generated by data of TMP_VMGI to record this data into the Rzone 1 so that work which closes the Rzone 1 is performed.

Namely, in the finalize processing, as shown in FIG. 5H, UDF and VMG of Rzone 1 are generated by information for management which is generated in this way and is held into memory to generate Lead In and Lead Out. It is to be noted that it is needless to say that in the case where write-once operation is performed onto the optical disc 2 which has not been yet finalized, data of UDF and VMG with respect to those VTSs are generated by TMP_VMGI acquired at the step SP2 of FIG. 3 with respect to the VTSs which have been already recorded onto the optical disc 2.

Thus, in the optical disc recording/reproducing apparatus 100, file of moving picture is recorded by DVD-Video Format Recording using the INC system.

Here, the finalize processing in the optical recording/reproducing apparatus 100 will be explained.

In this optical disc recording/reproducing apparatus 100, the finalize processing is divided into several processing and a notification of completion of one processing is memorized into the flash memory 16 every time the processing is completed. Before every processing is started, the remaining quantity of the battery is confirmed to judge by the battery remaining quantity whether or not processing to be performed from now is completed, whereby in the case where there is the possibility that processing is not completed, any processing is inhibited until the battery is replaced with charged battery. When it is detected that the battery has been replaced with battery having sufficient capacity, finalize processing is restarted subsequently to the processing which has been memorized into the flash memory 16.

Thus, even if capacity of the battery is consumed during finalize processing, the finalize processing is restarted, thereby making it possible to provide media which are in correspondence with the perfect DVD-Video format.

Figure 6:
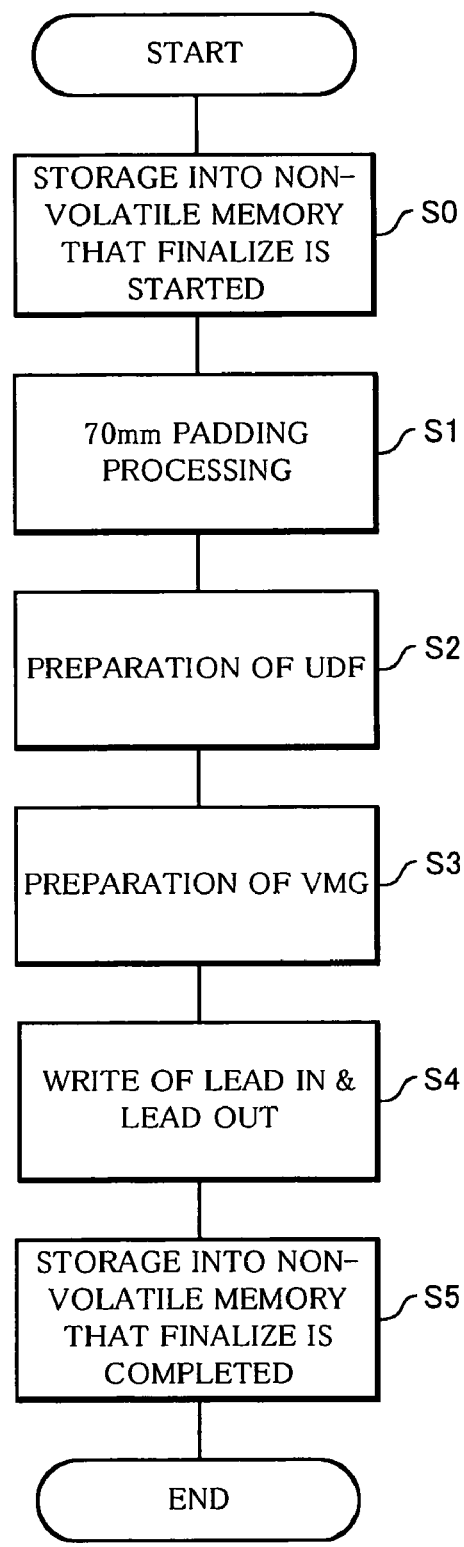
FIG. 6 is a flowchart showing outline of finalize processing in the optical disc recording/reproducing apparatus.

When attention is drawn to processing executed after user has instructed finalize processing, rough processing procedure includes steps S1 to S4 as shown in the flowchart of FIG. 6.

At step S1, 70 mm padding processing is performed.
At step S2, processing for preparing UDF is performed.
At step S3, processing for preparing VMG is performed.
At step S4, write processing for Lead-In/Lead-Out is performed.

It is to be noted that the fact that finalize processing is started is memorized into flash memory 16 before finalize processing (step S0). Thus, at the next time when power is turned ON, this value is referred, thereby making it possible to judge whether or not finalize processing is being performed. Moreover, at the last time of the finalize processing, the fact that the finalize processing has been completed is necessarily written back into the flash memory 16 (step S5).

Further, the facts that those processing have been completed are stored into the flash memory 16 for a time period during these respective processing to confirm the remaining quantity of the battery. At this time, if capacity of the battery is left enough for performing next processing, processing proceeds to the subsequent step. In the case where that capacity is not enough, user is hastened to exchange the battery to turn OFF power supply. Further, at the next time when power supply is turned ON, the content of the flash memory 16 is confirmed to thereby recognize the step in which the finalize processing has been completed among these processing, and finalize processing from the step subsequent thereto is restarted.

The 70 mm padding processing is divided, e.g., every IECC block and is repeatedly performed until the last recording position is above 70 mm from the inner circumference. At this time, the fact that processing of IECC block is completed is stored into the flash memory 16, and the remaining capacity of the battery is confirmed. Here, if the remaining capacity of the battery is a predetermined quantity or less, the finalize processing is interrupted at this stage.

Figure 7:
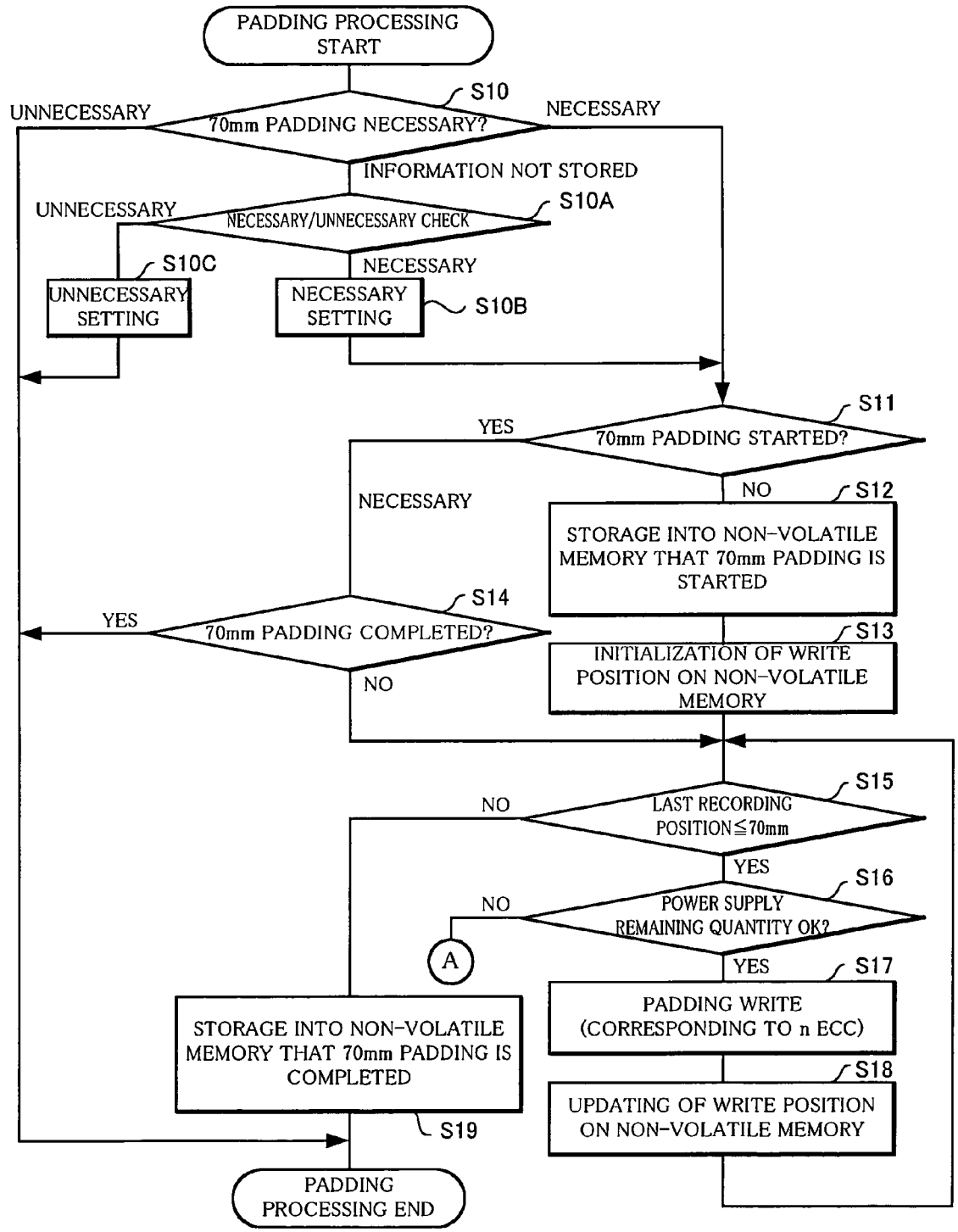
FIG. 7 is a flowchart showing procedure of 70 mm padding processing in the finalize processing.

The 70 mm padding processing of the step S1 is executed in accordance with the procedure shown in the flowchart of FIG. 7.

Namely, when the 70 mm padding processing of the step S1 is instructed, whether or not 70 mm padding is required is first judged by making reference to information stored in the flash memory 16 (step S10).

In the case where information indicating that 70 mm padding processing is necessary or unnecessary is not stored in the flash memory 16 as the result of judgment at the step S10, whether or not 70 mm padding is required is judged on the basis of the last recording position (step S10A) to store, into the flash memory 16, the information indicating that the 70 mm padding processing is necessary or unnecessary (steps S10B, S10C).

In the case where 70 mm padding is required as the result of the judgment at the step S10, processing proceeds to step S11.

Moreover, in the case where the last recording position reaches 70 mm from the disc inner circumference as the result of the judgment at the step S10 so that 70 mm padding is not required, processing is completed without 70 mm padding processing being performed.

At step S11, whether or not 70 mm padding is started is judged on the basis of information stored in the flash memory 16.

In the case where the judgment result of the step S11 is NO, i.e., 70 mm padding is not started, information indicating that 70 mm padding has been started is stored into the flash memory 16 (step S12) and write position on the flash memory 16 (step S13) is initialized to proceed to step S15.

Further, in the case where judgment result of the step S11 is YES, i.e., 70 mm padding has been already started, whether or not 70 mm padding is completed is judged on the basis of information stored in the flash memory 16 (step S14).

In the case where the judgment result of the step S14 is NO, i.e., 70 mm padding is not completed, processing proceeds to step S15. In the case where the judgement result is YES, i.e., 70 mm padding is completed, the 70 mm padding processing is completed.

At step S15, whether or not the last recording position falls within 70 mm from the disc inner circumference is judged on the basis of information stored in the flash memory 16.

In the case where judgement result at the step S15 is NO, i.e., the last recording position falls within 70 mm from the disc inner circumference, whether or not the remaining capacity of the battery is a predetermined quantity or more is judged (step S16). When the judgment result is NO, i.e., the remaining capacity of the battery is less than the predetermined quantity, finalize processing is interrupted at this stage.

If the judgment result at the step S16 is YES, i.e., the remaining capacity of the battery is the predetermined quantity or more which is required for performing padding write operation, padding write operation is performed (step S17) to update write position of the flash memory 16 (step S18) and processing returns to the judgment processing of the step S15 to repeatedly perform padding write operation until the last recording position is above 70 mm from inner circumference.

Moreover, in the case where the judgment result at the step S15 is YES, i.e., the last recording position reaches 70 mm from the disc inner circumference, information indicating that 70 mm padding has been completed is stored into the flash memory 16 (step S19) to complete 70 mm padding processing of the step S1.

Figure 8:
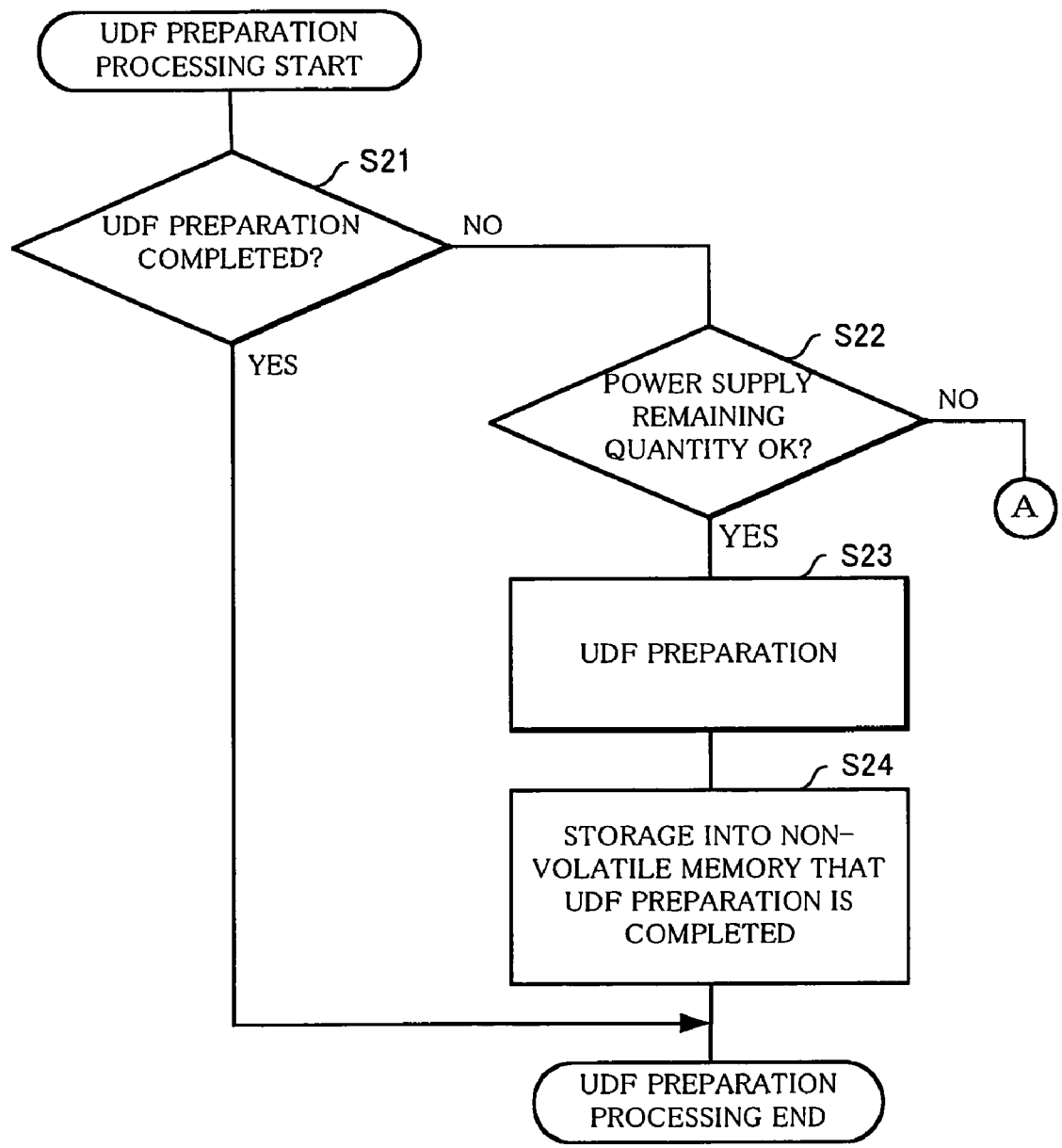
FIG. 8 is a flowchart showing the procedure of preparation processing for UDF in the finalize processing.

Since the processing for preparing UDF of the above-described step S2 cannot be divided, this processing is performed at a stretch as shown in the flowchart of FIG. 8.

Namely, in the processing for preparing UDF, whether or not preparation of UDF is completed is judged on the basis of information stored in the flash memory 16 (step S21). In the case where the judgment result thereof is NO, i.e., preparation of UDF is completed, processing is completed as it is.

In the case where the judgment result of the step S21 is NO, i.e., it is necessary to prepare UDF, whether or not the remaining quantity of the battery is a predetermined quantity necessary for write operation of UDF or more is judged before write operation of UDF is performed (step S22).

When the judgment result at the step S22 is NO, i.e., the remaining quantity of the battery is not sufficient for performing write operation of UDF, finalize processing is interrupted at this stage.

In the case where the judgment result at the step S22 is YES, i.e., the remaining quantity of the battery is sufficient for performing write operation of UDF, UDF is prepared (step S23) to store, into the flash memory 16, information indicating that preparation of UDF has been completed (step S24) and the processing for preparing UDF of the above-described step S2 is completed.

Figure 9:
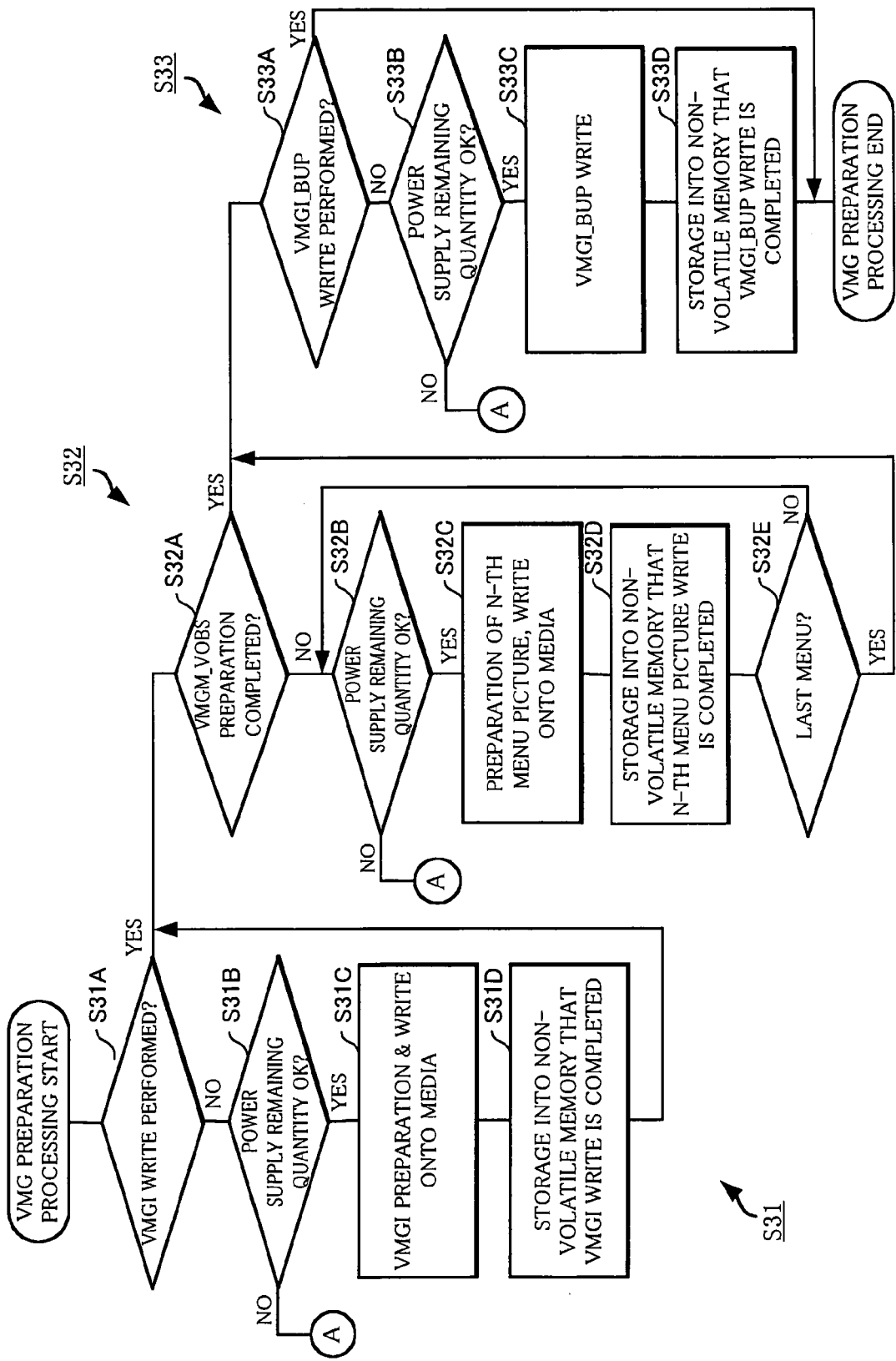
FIG. 9 is a flowchart showing the procedure of preparation processing for VMG in the finalize processing.

As shown in the flowchart of FIG. 9, the processing for preparing VMG of the above-described step S3 comprises processing for preparing and writing of VMGI (step S31), processing for preparing and writing of VMGM_VOBS (step S32), and processing for writing VMGI_BUP (step S33).

Here, if the remaining capacity of the battery is confirmed before respective processing are executed so that the capacity is not sufficient for completing processing, finalize processing is interrupted at that stage. If the capacity is sufficient, that processing is executed to store the fact thereof into the flash memory 16.

At the processing for preparing and writing of VMGI (step S31), whether or not preparation of VMGI is completed is first judged on the basis of information stored in the flash memory 16 (step 31A). In the case where the judgment result thereof is NO, i.e., it is necessary to prepare VMGI, whether or not the remaining quantity of the battery is a predetermined quantity necessary for write operation of VMGI or more is judged before write operation of VMGI is performed (step S31B).

In the case where the judgment result at the step S31B is NO, i.e., the remaining capacity of the battery is not sufficient for performing write operation of VMGI, the finalize processing is interrupted at this stage.

In the case where the judgment result at the step S31B is YES, i.e., the remaining capacity of the battery is sufficient for performing write operation of VMGI, VMGI is prepared (step S31C) to store, into the flash memory 16, information indicating that preparation of VMGI has been completed (step S31D) and processing for preparing and writing VMGM_VOBS (step S32) is performed.

Moreover, in the case where the judgment result of step S31A is YES, i.e., write operation of VMGI has been completed, processing for preparing and writing VMGM_VOBS (step S32) is performed.

In the processing for preparing and writing of VMGM_VOBS (step S32), whether or not preparation of VMGM_VOBS has been completed is first judged on the basis of information stored in the flash memory 16 (step S32A). In the case where the judgement result is NO, i.e., it is necessary to prepare VMGM_VOBS, whether or not the remaining capacity of the battery is a predetermined quantity necessary for write operation of VMGM_VOBS or more is judged before write operation of VMGM_VOBS is performed (step S32B).

In the case where the judgment result at the step S32B is NO, i.e., the remaining capacity of the battery is not sufficient for performing write operation of VMGM_VOBS, the finalize processing is interrupted at this stage.

In the case where the judgment result at the step S32B is YES, i.e., the remaining capacity of the battery is sufficient for performing write operation of VMGM_VOBS, the N-th menu picture for the N-th VMGM_VOBS is prepared and is written (step S32C), information indicating that preparation of menu picture for the N-th VMGM_VOBS has been completed (step S32D) is stored into the flash memory, and whether or not preparation of the last menu has been completed (step S32E) is judged.

Further, in the case where the judgment result of the step S32E is NO, i.e., menu picture for VMGM_VOBS to be prepared exists, processing returns to the step S32B. In the case where the remaining capacity of the battery is sufficient for performing write operation of next VMGM_VOBS, processing for preparing and recording menu picture for next VMGM_VOBS is repeatedly performed. If the judgment result of the step S32E is YES, i.e., preparation of the last menu has been completed, processing for writing VMGI_BUP (step S33) is performed.

In the write processing for VMGI_BUP (step S33), whether or not write operation of VMGI_BUP has been completed is first judged on the basis of information stored in the flash memory 16 (step S33A). In the case where the judgment result thereof is YES, i.e., write operation of VMGM_VOBS has been completed, processing is completed as it is.

In the case where the judgment result of the step S33A is NO, i.e., it is necessary to prepare VMGM_VOBS, whether or not the remaining capacity of the battery is a predetermined quantity necessary for write operation of VMGI_BUP or more is judged before write operation of VMGI_BUP is performed (step S33B).

In the case where the judgment result at the step S33B is NO, i.e., the remaining capacity of the battery is not sufficient for performing write operation of VMGI_BUP, the finalize processing is interrupted at this stage.

In the case where the judgment result at the step S33B is YES, i.e., the remaining capacity of the battery is sufficient for performing write operation of VMGI_BUP, VMGI_BUP is prepared and is written (step S33C), information indicating that write operation of VMGI_BUP has been completed (step S33D) is stored into the flash memory 16, and the preparation processing for VMG of the above-described step S33 is completed.

Figure 10:
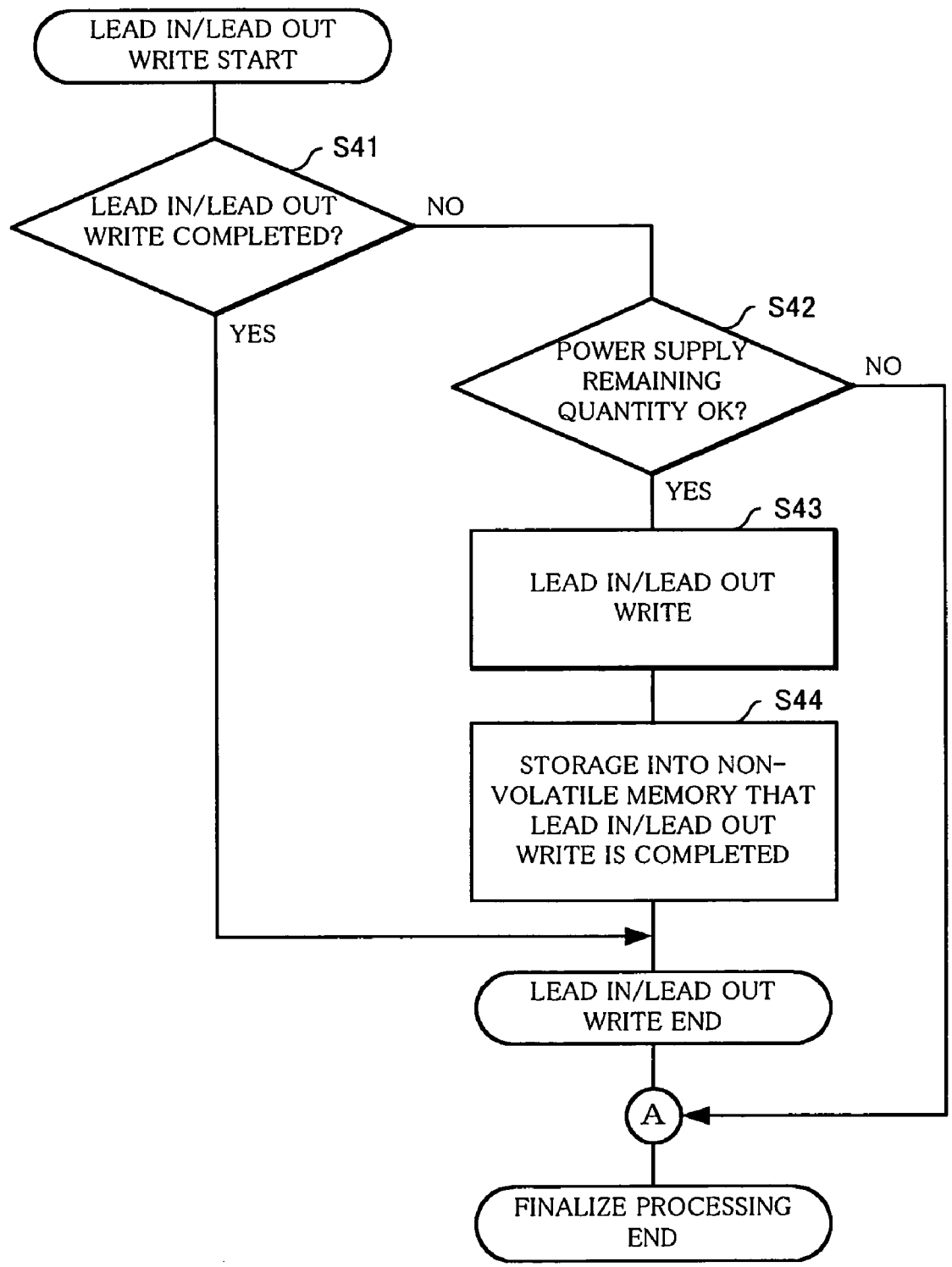
FIG. 10 is a flowchart showing the procedure of write processing for Lead-In/Lead-Out in the finalize processing.

Since the write processing for Lead-In/Lead-Out of the above-described step S4 cannot be divided, such processing is performed at a stretch as shown in the flowchart of FIG. 10.

Namely, in the write processing for Lead-In/Lead-Out, whether or not write operation of Lead-In/Lead-Out has been completed is first judged on the basis of information stored in the flash memory 16 (step S41). In the case where the judgment result thereof is NO, i.e., write operation of Lead-In/Lead-Out has been completed, the processing is completed as it is.

Further, in the case where the judgment result of the step S41 is NO, i.e., it is necessary to perform write operation of Lead-In/Lead-Out, whether or not the remaining capacity of the battery is a predetermined quantity necessary for write operation of Lead-In/Lead-Out or more is judged before write operation of Lead-In/Lead-Out is performed (step S42).

When the judgment result at the step S42 is NO, i.e., the remaining capacity of the battery is not sufficient for performing write operation of UDF, the finalize processing is interrupted at this stage.

Further, in the case where the judgment result at the step S42 is YES, i.e., the remaining capacity of the battery is sufficient for performing write operation of Lead In/Lead Out, Lead-In/Lead-Out is written (step S43), information indicating that write operation of Lead-In/Lead-Out has been completed (step S43) is stored into the flash memory 16, and the write processing for Lead-In/Lead-Out of the above-described step S4 is completed.

Figure 11:
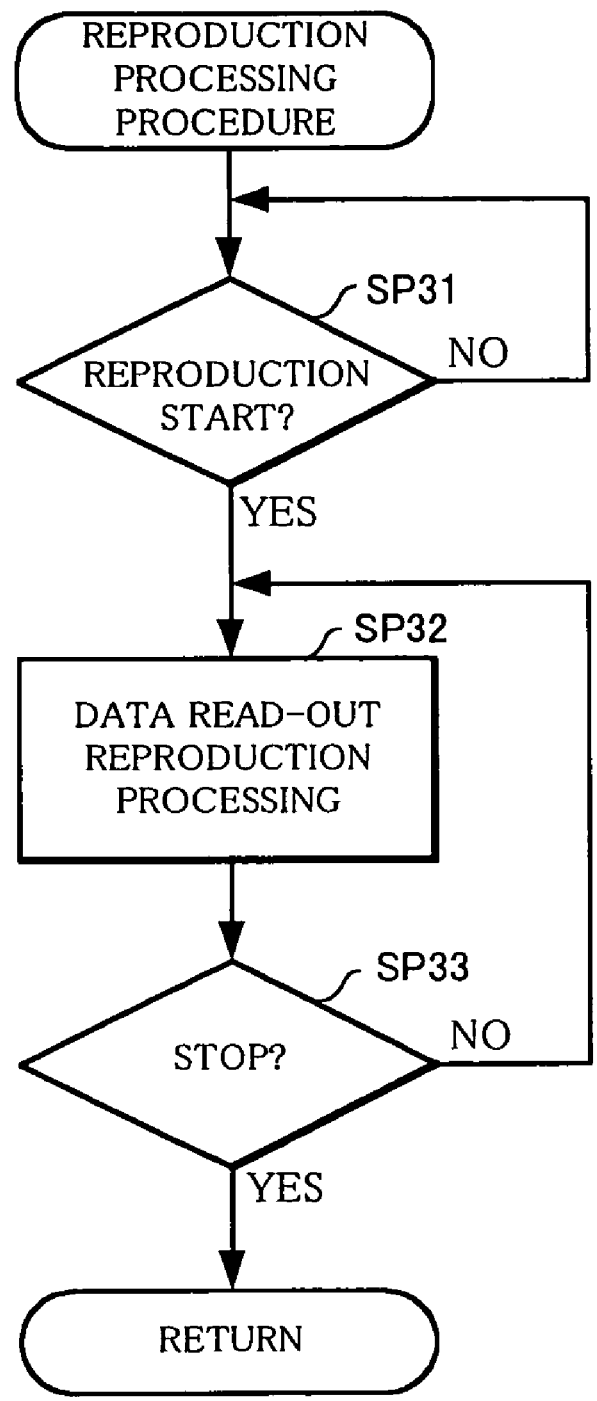
FIG. 11 is a flowchart showing the procedure of reproduction processing for image file in the optical disc recording/reproducing apparatus.

FIG. 11 is a flowchart showing the procedure of reproduction processing in the optical disc recording/reproducing apparatus 100 adapted for recording video data onto the optical disc 2 in a manner as described above. When the system controller 10 starts this reproduction processing procedure, the system controller 10 judges at step SP31 whether or not start of reproduction is instructed by user. When the denial result is obtained at this step, the system controller 10 repeats the step SP31. On the contrary, when the affirmative result is obtained, processing shifts from the step SP31 to step SP32. At this step, the system controller 10 controls the entire operation so as to reproduce file of image instructed by user, with information for management recorded and held in the flash memory 16 being as reference.

Namely, in the case where the optical disc 2 is finalize-processed optical disc, reproduction position of corresponding title is detected by data of VMG held in the flash memory 16 and respective units of the optical disc recording/reproducing apparatus 100 is instructed to perform reproduction from this reproduction position. On the contrary, in the case where the optical disc 2 is an optical disc which is not finalize-processed, reproduction position of corresponding title is detected by TMP_VMGI and VTSI, VTSTT_VOBS of respective titles which are held in the flash memory 16 and respective units of the optical recording/reproducing apparatus 100 is instructed to perform reproduction from this reproduction position.

When reproduction is instructed in this way, processing by the system controller 10 subsequently shifts to step SP33 to judge whether or not stop of reproduction is instructed by user. When the denial result is obtained at this step, processing returns to the step SP32. Thus, the system controller 10 repeats processing procedure of steps SP32-SP33-SP32 to sequentially reproduce file of moving picture instructed by user. On the contrary, when the affirmative result is obtained at the step SP33, the operation of reproduction is completed to complete this reproduction processing procedure.

While the case where video data are recorded onto DVD-R by the INC system has been described in the above-mentioned explanation, video data may be recorded onto DVD-RW by the ROW system.

Figures 12A, 12B, 12C, 12D, 12E, 12F, 12G:
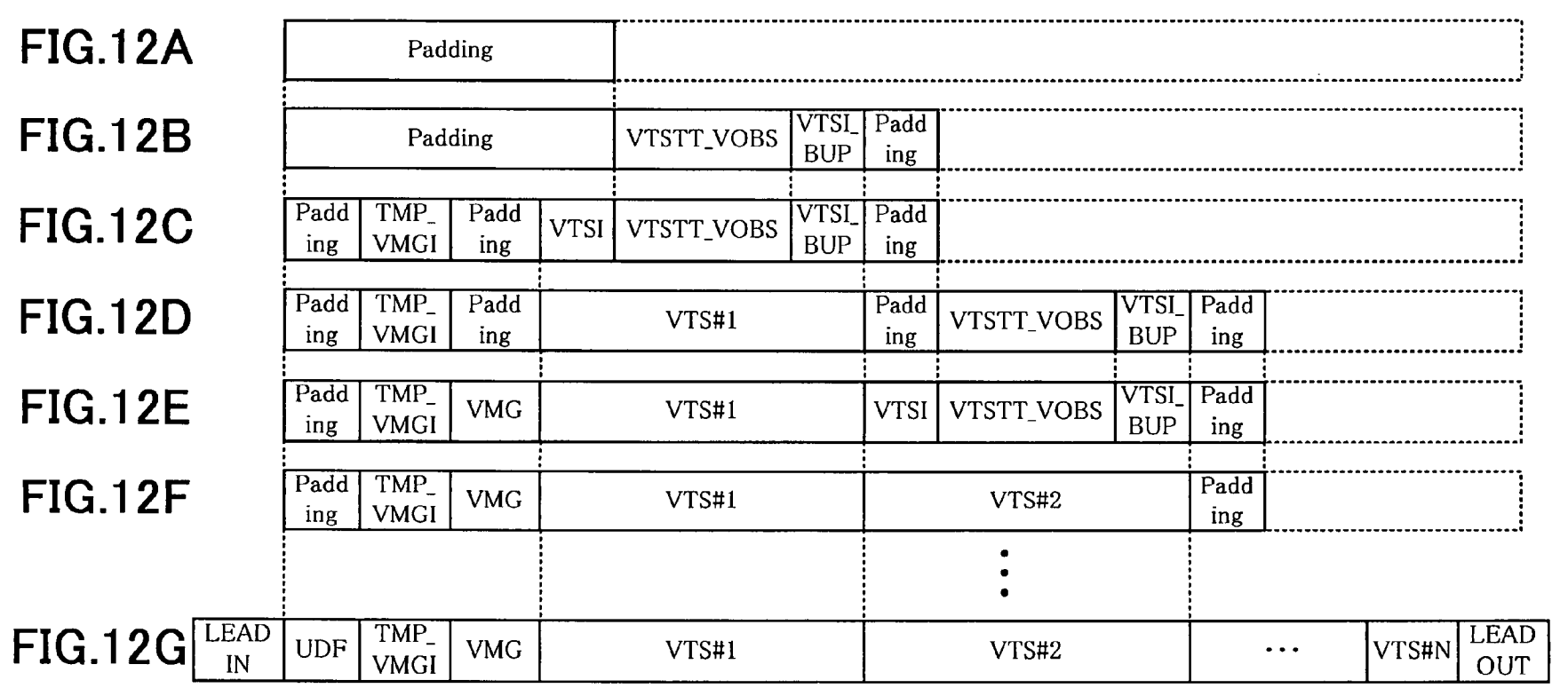

The recording procedure of DVD-Video Format Recording by the ROW system is shown in FIG. 12. In the ROW system, as shown in FIG. 12A, Lead In, UDF area, VMG area and recording areas of VTSI and VTSM_VOBS of the leading VTS are ensured in advance by Padding. Here, Padding is a processing for recording dummy data such as NULL, etc. to ensure areas.

When these areas are ensured in this way, images are sequentially recorded as shown in FIG. 12B in the ROW system so that VTSTT_VOBS by real data is formed. When recording of real data is completed with respect to one VTS, VTSI_BUP is sequentially recorded. Further, in order to ensure recording areas of VTSI and VTSM_VOBS of the subsequent VTS, processing of Padding is executed. Moreover, subsequently, returning to the leading side, as shown in FIG. 12C, VTSI and VTSM_VOBS corresponding to recording of the real data are formed. Further, TMP_VMGI is recorded between area for UDF and area for VMG. At this time point, the first title (VTS#1) is completed. In this way, in the ROW system, one VTS#1 is recorded onto the optical disc.

Subsequently, in the case where next VTS is recorded, real data is recorded subsequently to the area of Padding formed by VTS immediately therebefore, as shown in FIG. 12D, so that VTSTT_VOBS and VTSI_BUP are formed. In order to ensure recording areas of VTSI and VTSM_VOBS of the subsequent VTS, processing of Padding is executed. Subsequently, as shown in FIG. 12E, VTSI and VTSM_VOBS are formed. Further, TMP_VMGI between area for UDF and area for VMG is overwritten. At this time point, the second title (VTS#2) is completed. In this way, in the ROW system, as shown in FIG. 12F, subsequent VTS#2 is recorded onto the optical disc.

In the ROW system, when VTS is subsequently recorded, processing such as Padding, etc. is similarly executed so that VTSs are sequentially recorded.

Here, the optical disc, in which VTSs are sequentially recorded by the ROW system so that VTS recording area A3 is formed, can be reproduced by reproducing apparatus, etc. complying with only DVD-Video format, as a result of performing format conversion by finalize processing similar to that of the INC system which has been explained with reference to FIGS. 6 to 10.

Namely, in the finalize processing, as shown in FIG. 12G, in order to comply with DVD-Video format, Padding write operation is performed so that the last recording position becomes in correspondence with 70 mm from inner circumference, and thereafter UDF and VMG from management information of respective titles are prepared and recorded into the UDF area and the VMG area, which have been first caused to undergo Padding, so that UDF area and VMG area are formed. Further, Lead-In information is recorded at the innermost circumference so that Lead-In area is formed, and Lead-Out information is recorded at the outermost circumference so that Lead-Out area is formed.

The optical disc to which the finalize processing has been implemented can maintain compatibility with DVD-Video format used for reproduction only optical DVD-ROM.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

As described above, in accordance with the present invention, finalize processing is divided into several processing, and a notification of completion of one processing is memorized into non-volatile memory every time the processing is completed. Before every processing is started, the remaining quantity of the battery is confirmed to judge by the battery remaining quantity whether or not processing to be performed from now is completed, whereby in the case where there is the possibility that the processing is not completed, any processing is inhibited until the battery is replaced with charged battery. When it is detected that the battery is replaced with battery having sufficient capacity, finalize processing is started subsequently to the processing which has been memorized into the non-volatile memory. Thus, finalize processing is started even if the battery capacity is consumed during finalize processing, thereby making it possible to provide media caused to be in correspondence with perfect DVD-Video format. Namely, in accordance with the present invention, even if the remaining capacity of the battery becomes insufficient during finalize processing, the battery is replaced with battery having sufficient capacity to restart finalize processing, thereby making it possible to prevent media from becoming to be in the incomplete state where neither write-once operation nor reproducing operation is performed.

The invention claimed is:

1. An optical recording method for recording data onto an optical recording medium, comprising:

partitioning a data zone into a first management information area, serving as file system area, a second management information area, corresponding to a reproduction management system for real time data, and a data area in which the real time data are recorded;

dividing final processing into padding processing by executing padding recording to a predetermined last recording position;

first management information processing of recording a file system, prepared in a format compatible with another file system and including information for managing reproduction management information recorded in the second management information area and the real time data recorded in the data area, in the first management information area;

second management information processing of recording a reproduction management system, including a reproduction management information managing reproduction of the real time data recorded in the data area, in the second management information area;

recording processing of preparing a lead-in area and a lead-out area;

judging, before starting every dividing final processing, whether remaining battery capacity is sufficient for completing execution of dividing final processing by confirming the remaining battery capacity;

executing the dividing final processing and storing, in a non-volatile memory, a notification of completion of one dividing final processing every time the dividing final processing is completed, when the remaining battery capacity is sufficient;

interrupting the dividing final processing when the remaining battery capacity is not sufficient; and restarting the interrupted processing subsequent to the dividing final processing which has been stored in the non-volatile memory, at the time point when the remaining battery capacity becomes sufficient.

2. The optical recording method as claimed in claim 1, wherein the remaining battery capacity is confirmed, before starting every processing, to determine whether the remaining battery capacity is sufficient for completing executed processing, wherein when the remaining battery capacity is sufficient, the processing is executed.

3. The optical recording method as set forth in claim 2, wherein when the remaining battery capacity is not sufficient, the finalize processing is interrupted at the processing, wherein at the time point when the remaining battery capacity becomes sufficient, the finalize processing is restarted subsequent to the processing that has been stored in the non-volatile memory.

4. The optical recording method as set forth in claim 1, further comprising:

updating the non-volatile memory with additional finalize processing.

5. An optical recording apparatus for recording data onto an optical recording medium, comprising:

means for partitioning a data zone into a first management information area, serving as file system area, a second management information area, corresponding to a reproduction management system for real time data, and a data area in which the real time data are recorded;

means for dividing final processing into padding processing by executing padding recording to a predetermined last recording position;

means for first management information processing of recording a file system, prepared in a format compatible with another file system and including information for managing reproduction management information recorded in the second management information area and the real time data recorded in the data area, in the first management information area;

means for second management information processing of recording a reproduction management system, including a reproduction management information managing reproduction of the real time data recorded in the data area, in the second management information area;

means for recording processing of preparing a lead-in area and a lead-out area;

means for judging, before staffing every dividing final processing, whether remaining battery capacity is sufficient for completing execution of dividing final processing by confirming the remaining battery capacity;

means for executing the dividing final processing and storing, in a non-volatile memory, a notification of completion of one dividing final processing every time the dividing final processing is completed, when the remaining battery capacity is sufficient;

means for interrupting the dividing final processing when the remaining battery capacity is not sufficient; and means for restarting the interrupted processing subsequent to the dividing final processing which has been stored in the non-volatile memory, at the time point when the remaining battery capacity becomes sufficient.

6. The optical recording apparatus as claimed in claim 5, wherein the control means confirms the remaining battery capacity before staffing every processing to determine whether the remaining battery capacity is sufficient for completing executed processing, wherein when the remaining battery capacity is sufficient, the control means executes the processing.

7. The optical recording apparatus as claimed in claim 6, wherein the control means is operative so that when the remaining battery capacity is not sufficient, the control means interrupts finalize processing at that processing, whereby at the time point when the battery remaining quantity becomes sufficient, the control means restarts finalize processing subsequent to the processing that has been stored in the non-volatile memory.

8. The optical recording apparatus as claimed in claim 5, further comprising:

means for updating the non-volatile memory with additional finalize processing.

* * * * *